（12） United States Patent
Caskey et al.

(10) Patent No.: US 9,305,038 B2
(45) Date of Patent: Apr. 5, 2016

(54) INDEXING OF SIGNIFICANT MEDIA GRANULARS

(71) Applicant: International Business Machines Corporation, Armonk, NY (US)

(72) Inventors: Sasha P. Caskey, New York, NY (US); Dimitri Kanevsky, Ossining, NY (US); Peter K. Malkin, Yorktown Heights, NY (US); Tara N. Sainath, New York, NY (US)

(73) Assignee: International Business Machines Corporation, Armonk, NY (US)

(*) Notice: Subject to any disclaimer, the term of this patent is extended or adjusted under 35 U.S.C. 154(b) by 300 days.

(21) Appl. No.: 13/866,172

(22) Filed: Apr. 19, 2013

(65) Prior Publication Data

US 2014/0317123 A1    Oct. 23, 2014

(51) Int. Cl.
*G06F 17/30* (2006.01)

(52) U.S. Cl.
CPC .... *G06F 17/30321* (2013.01); *G06F 17/30997* (2013.01)

(58) Field of Classification Search
CPC .......... G06F 17/30864; G06F 17/30613; G06F 17/30817; G06F 17/30017; G06F 17/30321; G06F 17/30858; G06F 17/30029; G06F 17/3053
USPC ..................................................... 707/741
See application file for complete search history.

(56) References Cited

U.S. PATENT DOCUMENTS

| 6,578,040 | B1 | 6/2003 | Syeda-Mahmood |
| 7,826,911 | B1* | 11/2010 | Bennett ........................... 700/94 |
| 2002/0083060 | A1* | 6/2002 | Wang et al. ...................... 707/10 |
| 2003/0033347 | A1* | 2/2003 | Bolle et al. ..................... 709/107 |
| 2006/0173916 | A1* | 8/2006 | Verbeck Sibley et al. . 707/104.1 |
| 2007/0106693 | A1* | 5/2007 | Houh et al. ................. 707/104.1 |
| 2009/0187567 | A1* | 7/2009 | Rolle ................................ 707/6 |
| 2009/0319472 | A1 | 12/2009 | Jain et al. |
| 2009/0327896 | A1 | 12/2009 | Pall et al. |
| 2013/0325869 | A1* | 12/2013 | Reiley et al. .................. 707/741 |

OTHER PUBLICATIONS

Hsu et al., Style & Topic LanguageModel Adaptation Using HMM-LDA, EMNLP 2006, Sydney, Australia, Jul. 22-23, 2006.

* cited by examiner

*Primary Examiner* — Yuk Ting Choi
(74) *Attorney, Agent, or Firm* — Scully, Scott, Murphy & Presser, P.C.; Nidhi Garg (57) ABSTRACT

Identifying significant media granulars may comprise partitioning a media document into one or more media granulars. A score may be assigned to each of the one or more media granulars. The one or more media granulars may be monitored to detect one or more user actions on the one or more media granular. The score associated with a respective one of the media granulars may be updated based on a number of user actions detected on the respective one of the media granulars. A media granular may be identified as being significant based on the score meeting a threshold.

12 Claims, 7 Drawing Sheets

INDEXING OF SIGNIFICANT MEDIA GRANULARS

FIELD

The present application relates generally to computers, and computer applications, and more particularly to indexing of media granulars.

BACKGROUND

Searching for information may be done by semantic concepts or topics. Another way of searching is by utilizing indexed data. For instance, artifacts such as articles, web pages, images, words in a text, and others, for example, available via a medium such as the Internet or another network, data storage device or media device, may be indexed. Such indexes may be utilized by various services, for example, for statistical analyses, citations, social networking, advertising, and others.

With existing indexing processes, however, there are still some features associated with media data that remain undetected. For example, while there is a citation information for Einstein's general relativity paper, there is no information on how often Einstein's famous formula $E=mc^2$ was actually processed by others in various activities, like sending e-mails, presentations, etc. It can happen that while some basic article or song has relatively low citation or attention, some of its phrases may become very popular and catch significant attention, actively circulated or reproduced in some way (e.g., e-mail, social network, microblogging, record playing). It is also possible and often common that these phrases become more popular in societies or languages different from the ones in which they originated.

BRIEF SUMMARY

A method for indexing media granulars, in one aspect, may comprise partitioning a media document into one or more media granulars. The method may also comprise assigning a score to each of the one or more media granulars. The method may further comprise monitoring the one or more media granulars to detect one or more user actions on said one or more media granular. The method may further comprise updating the score associated with a respective one of the media granulars based on a number of user actions detected on the respective one of the media granulars. The method may also comprise identifying a media granular as significant based on the score meeting a threshold.

A system for indexing media granulars, in one aspect, may comprise a partitioning module operable to execute on a processor and partition a media document into one or more media granulars. A score assignment module may be operable to assign a score to each of the one or more media granulars. A monitoring module may be operable to monitor said one or more media granulars to detect one or more user actions on the one or more media granular. The score assignment module may be further operable to update the score associated with a respective one of the media granulars based on a number of user actions detected on the respective one of the media granulars. A media granular may be identified as being significant based on the score meeting a threshold.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Identifying and indexing of media granulars are presented. For example, one or more media parts of data items are identified and indexed as media granulars. A media part is also referred to as a media granular in this disclosure. Occurrence and/or usage of those parts may be monitored for further updating of the indexing. For instance, significant parts in media may be identified and indexed as media granulars. The degree of significance may be defined or measured based on, e.g., observing user actions on those parts.

Generally, in one embodiment of the present disclosure, identification of significant media parts may include topic and semantic identification of important parts and components of textual data, or other media data available on the Internet or another network, or in computers or other media devices, e.g., computers, cell phones, TV sets, players, etc. User actions may be observed. For example, pasting and copying some parts of text, pictures or other forms of media, sending some portions or parts of data via e-mail, micro-blogging, and/or posting on various media forums (e.g., video sharing website, blogs, and/or others) may be detected. These actions may be classified, monitored and interpreted as an indicator of significance of data parts being processed. In one aspect, observation can have one or several layers or levels. For example, one action comprises one layer of observation. For instance, if it was observed only that some portion of a text is pasted, this observation is considered as having one level. As another example, if it was observed that the portion was pasted, copied to a file and the file was sent via e-mail and a receiver of this file presented it, this observation is considered to have 4 levels at least.

Identification of significant media parts further may include matching various portions of data that appear in different locations and media points. Identification of significant media parts may also include direct insertion of data that was presented in a medium where the other methods are not capable of capturing the data, e.g., a speech, dinner table conversation, and/or others. This step may cover the situation where one of the participants in the event enters the important part of information manually into a system implementing a methodology of the present disclosure.

Media granulars can be parts of texts, parts of images, parts of audio, formulas, songs, biometrics, or a set of associated parts from different media pieces that are represented in some format, e.g., models, exemplars, clusters, and/or others. A granular may comprise a phrase in a song, object in a picture, and others.

Applications of use for indexed granular data may include citation index that is based on granulars in scientific papers, advertising that is based on popular granulars, plagiarism prevention, and others.

Indexed granulars, in one embodiment, may be qualified based on how long (amount of time) they have been accessed (e.g., the granular "e=mc^2" has been used for 60 years while "to be, or not to be" has been used for over 150 years). Other criteria for qualifying the indexed granular may include, but are not limited to: Indication of the range of media through which the given granular has been accessed; Different contexts in which a granular has been used (e.g., scientific, theatrical, marketing); Capturing and recording of the different semantic properties across cultures and languages. The access over time qualifier may also show the given granular's variation of popularity over time.

A new instance of the media granular may be created as part of a newly created media object, e.g., new instance of the Mona Lisa's smile created within of new sketch including all of the Mona Lisa's face. The new instance of the media granular then may be considered as another level of observation, which may increase the significance of the media granular.

Figure 1:
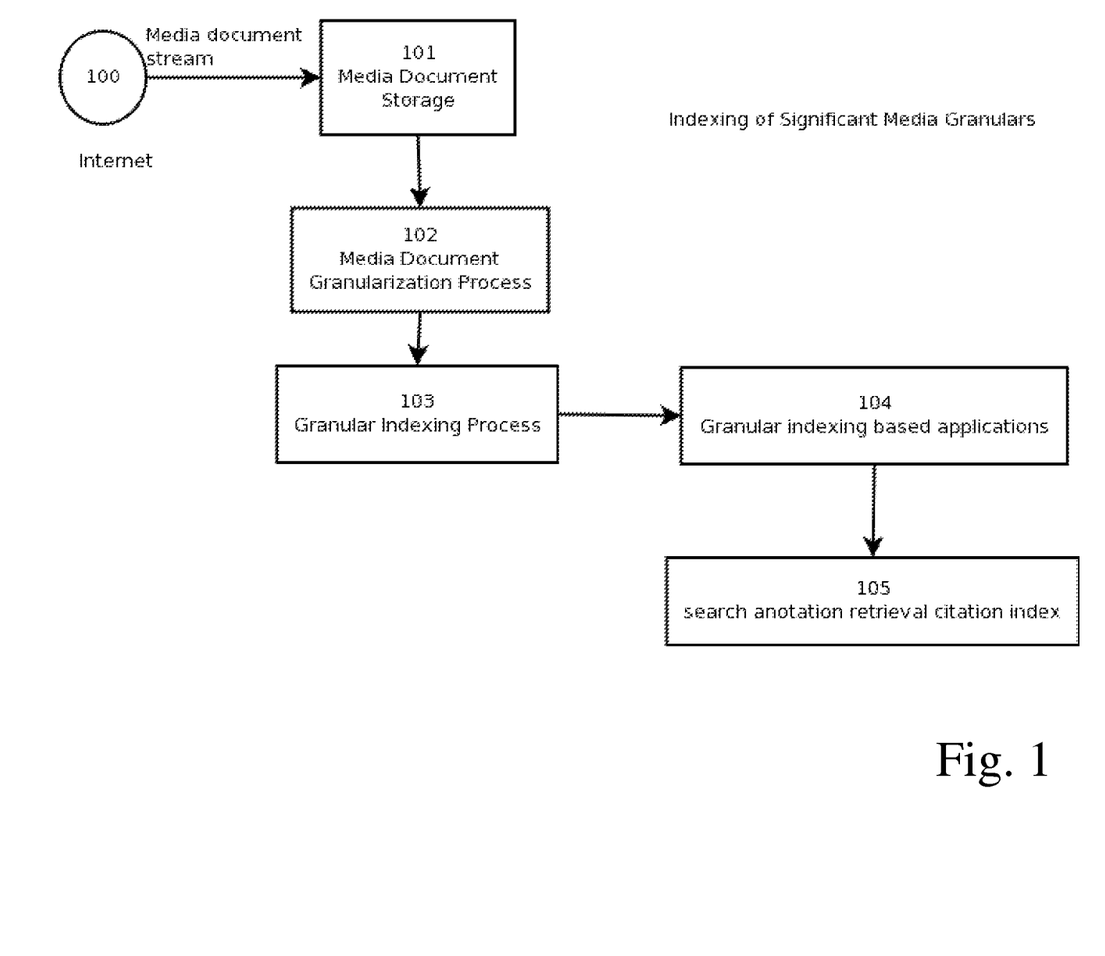
FIG. 1 illustrates a flow diagram for identifying significant media granulars and indexing them in one embodiment of the present disclosure.

FIG. 1 illustrates a flow diagram for identifying significant media granulars in one embodiment. At 101, data such as media data may be stored, e.g., in a form of media document. Such data may be received via a network (e.g., shown at 100) such as the Internet or another network and/or via another media devices such as computer, cell phone, television set, player, and others.

At 100, data, for example, from a network such as the Internet may be stored in a storage device, e.g., shown at 101.

Figure 2:
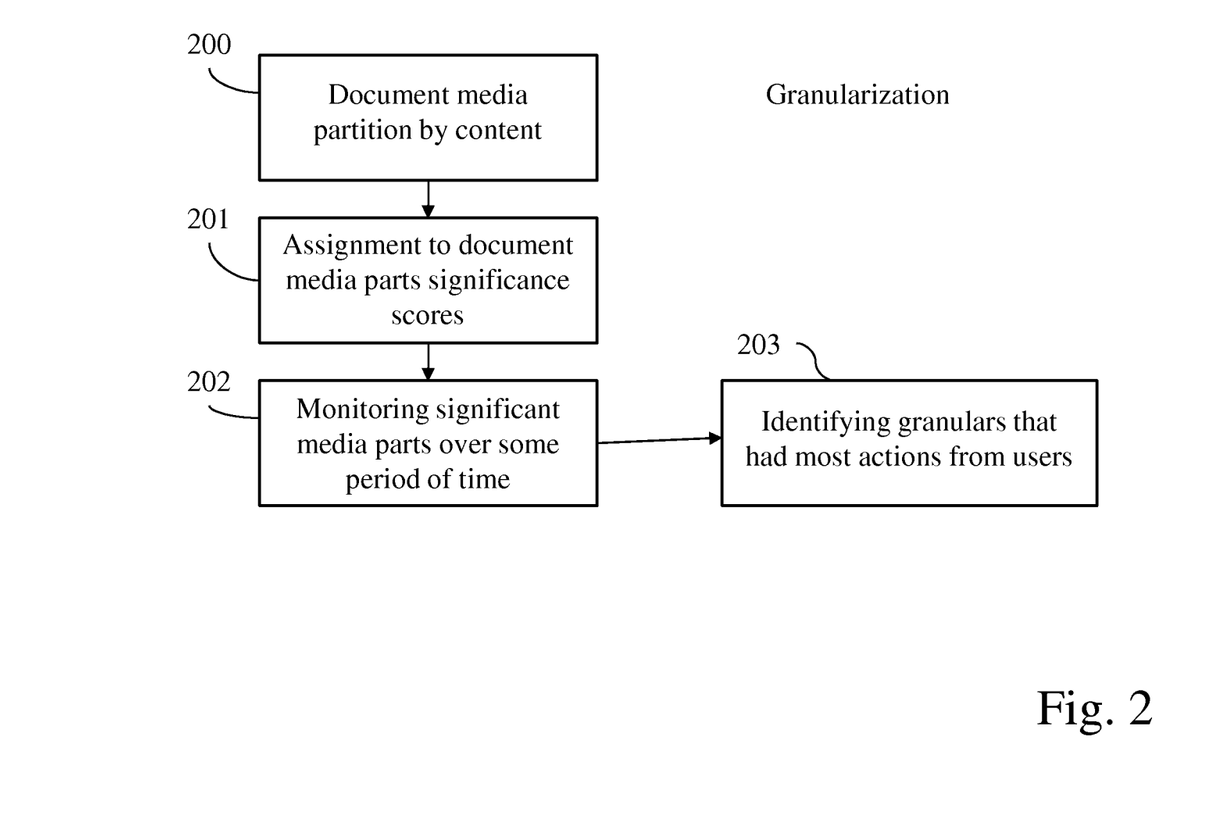
FIG. 2 is a flow diagram illustrating a granularization process in one embodiment of the present disclosure.

At 102, the media data or document is granularized. FIG. 2 further describes media document granularization process of 102. FIG. 2 at 201 also describes this processing. In this way, a database of media granulars may be created that includes media granulars identified from a plurality of documents and other sources. Identified and scored media granulars may be indexed in a vector or an array. The granularization process may be repeated periodically as more data is streamed in or obtained and the media document storage 101 gets updated.

At 103, granular indexing process may include updating of the granulars, e.g., created at 102, or creating of additional granulars discovered in given documents or sources on in an on-going manner.

At 104, the indexed granular may be applied or used, e.g., in citing references in a journal, in determining or selecting items for advertisements, and/or in other ways.

At 105, search annotation retrieval citation indexing may be performed. In general, indexing of data can be used for citation index, e.g., how many people cited this data and/or how many times it was cited. For example, a granular can represent a formula (i.e., an example granular may be a mathematical formula). A methodology in one embodiment of the present disclosure may create information about what was done with this formula, e.g., in which articles it was cited, in what presentation it was presented. The more actions performed with this formula, the higher the scientific value of this formula, and, e.g., higher is a significance index for a person who created the formula. This is similar to determining that the more a paper is cited, the higher is its scientific value and the higher a significance science index for a person who created this paper. At 105, such index may be searched and used.

FIG. 2 is a flow diagram illustrating a granularization process in one embodiment of the present disclosure, for example, shown at 102 in FIG. 1. At 200, a document may be partitioned by its content into parts. For example, a document may be partitioned by a text term or phrase, a mathematical formula, a media element such as an audio element and a video element that are parts of the document. In another aspect, contents of video or audio file may be partitioned into parts. Partitioning of a document is further described with reference to FIG. 3. These partitioned parts are also referred to as media granular.

At 201, a score (also referred to as a significance score) may be assigned to each of the parts. Assigning of a score is further described with reference to FIG. 4.

At 202, the document or media parts may be monitored over a period of time. For instance, user actions on those parts may be monitored over a period of time. The period of time may be a predetermined time, which may be configurable. Based on the user actions, the score assigned to a media part may be updated. For example, more access or usage on a media part may increase the score of that media part. As an example, the monitoring may include listening for or receiving a signal or communication from one or more applications via which a user may act on those media granulars. For instance, an email program which allows a user to compose a message may detect a usage of the media part and send that information to the monitoring process at 202. As another example, a social networking site's application program may detect user actions such as copy and paste on the media part, for instance, when a user posts information on his or her social network page. Such information may be received at the monitoring process at 202.

At 203, significant media granulars are identified. Whether a media part is significant may be determined based on a significance criterion. A significance criterion may include determining whether the significance score associated with the media part meets a threshold value. In one embodiment, user actions on the parts may be monitored and counted. The count of user actions may increase the significance score. Thus, a part or granular may be identified as being significant based on the number of actions performed on that part. The number may be a configurable threshold. Media granular identified as significant may be indexed, e.g., as a vector or array of media granular with associated scores.

Figure 3:
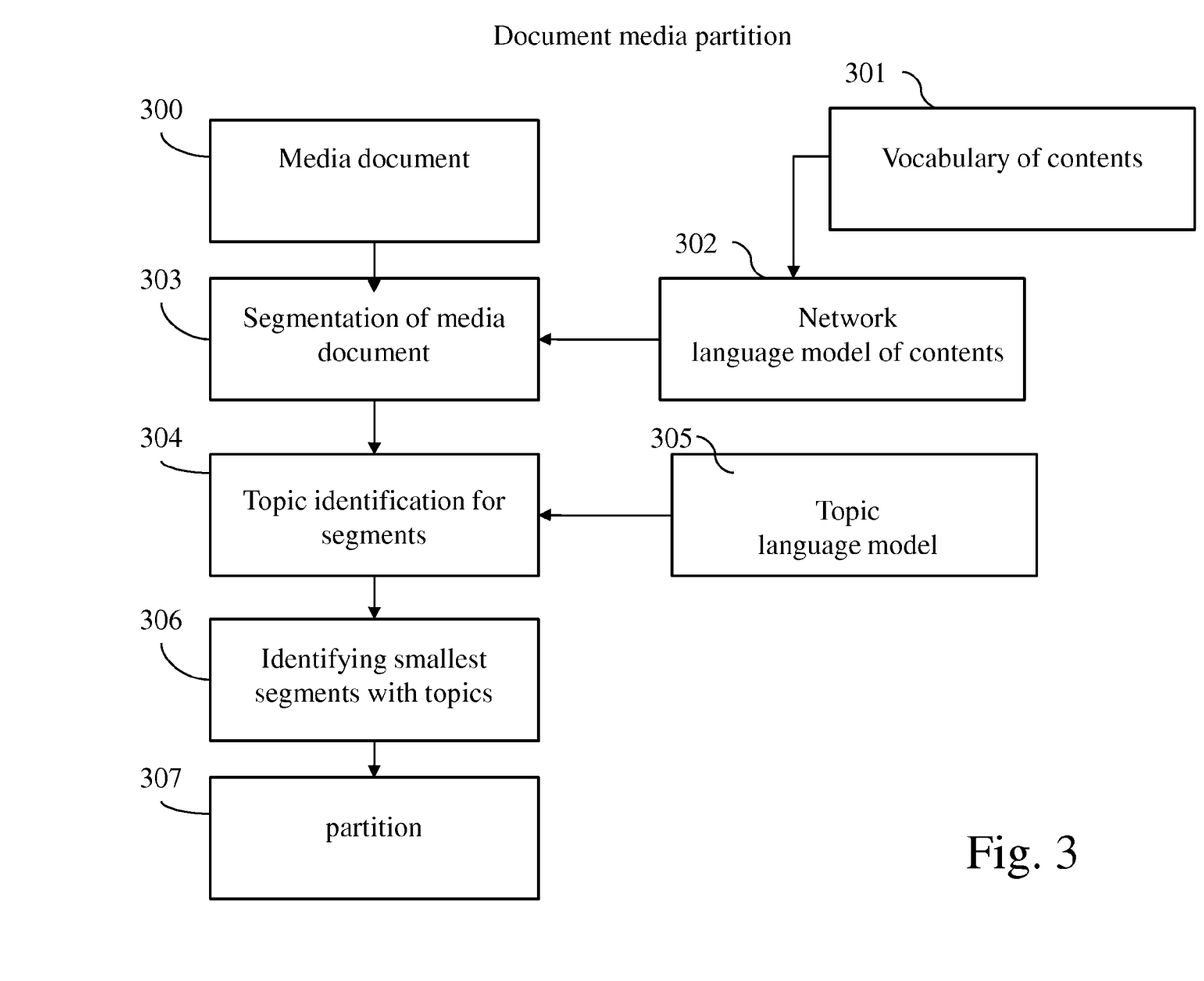
FIG. 3 is a flow diagram illustrating partitioning of a document in one embodiment of the present disclosure.

FIG. 3 is a flow diagram illustrating partitioning of a document, e.g., shown at 200 in FIG. 2, in one embodiment of the present disclosure. At 300, the document, e.g., a media document is received. Further, at 301, vocabulary of contents may be received. When media is partitioned, there can be some typical partition blocks. For example, the lips in the Mona Lisa painting, or the happy birthday song tune, or the famous formula (e.g., E=mc^2). These typical media partitionings become standard blocks that can be described in the form of an array (e.g., list) that is referred to in the present disclosure as vocabulary contents. At 302, network language model of contents is received.

At 303, the document may be segmented based on the vocabulary of contents 301 and the network language model of contents 302. For instance, a language model provides the probability or the likelihood of a sequence of words occurring. It may be used in the segmentation process to aid where to segment the document.

At 304, a topic may be identified corresponding to a document segment, e.g., based on a topic language model received at 305. For example, a topic language model provides the probability or the likelihood of a topic occurring. It is also used in the segmentation process to aid where to segment the document. In general, topic segmentation is the division of language data into segments or chunks, based upon the topic or subject discussed. For example, news broadcast which covers four different stories or articles clearly divides naturally into four different topics. Less clearly, a multi-page magazine article, while ostensibly covering a single broad topic, will usually cover a series of subtopics as it examines different aspects of its subject matter and explores the subject area.

Topic language model at 305, for example, may include assignment of words to topics. At 306, the smallest segments with topics are identified. Once the document is segmented, this process counts words in the segments, and identifies those with the fewest words, e.g., shortest, e.g., based on a threshold.

At 307, the document is partitioned into new segments. In one embodiment of a methodology of the present disclosure, partitioning is performed in a hierarchical manner. For example, media documents are partitioned into segments using large categories, for example, text is partitioned in pieces of different topics, or picture is partitioned into large zones—like skies, sea, beaches. Then large pieces of parts are partitioned into smaller parts (e.g., textual topics are partitioned into subsets that are associated with key words, or parts of pictures like sea is partitioned into smaller images waves, ships, fish, etc.) The new segments partitioned at 307 thus may comprise smaller segments of the segments of 303.

Figure 4:
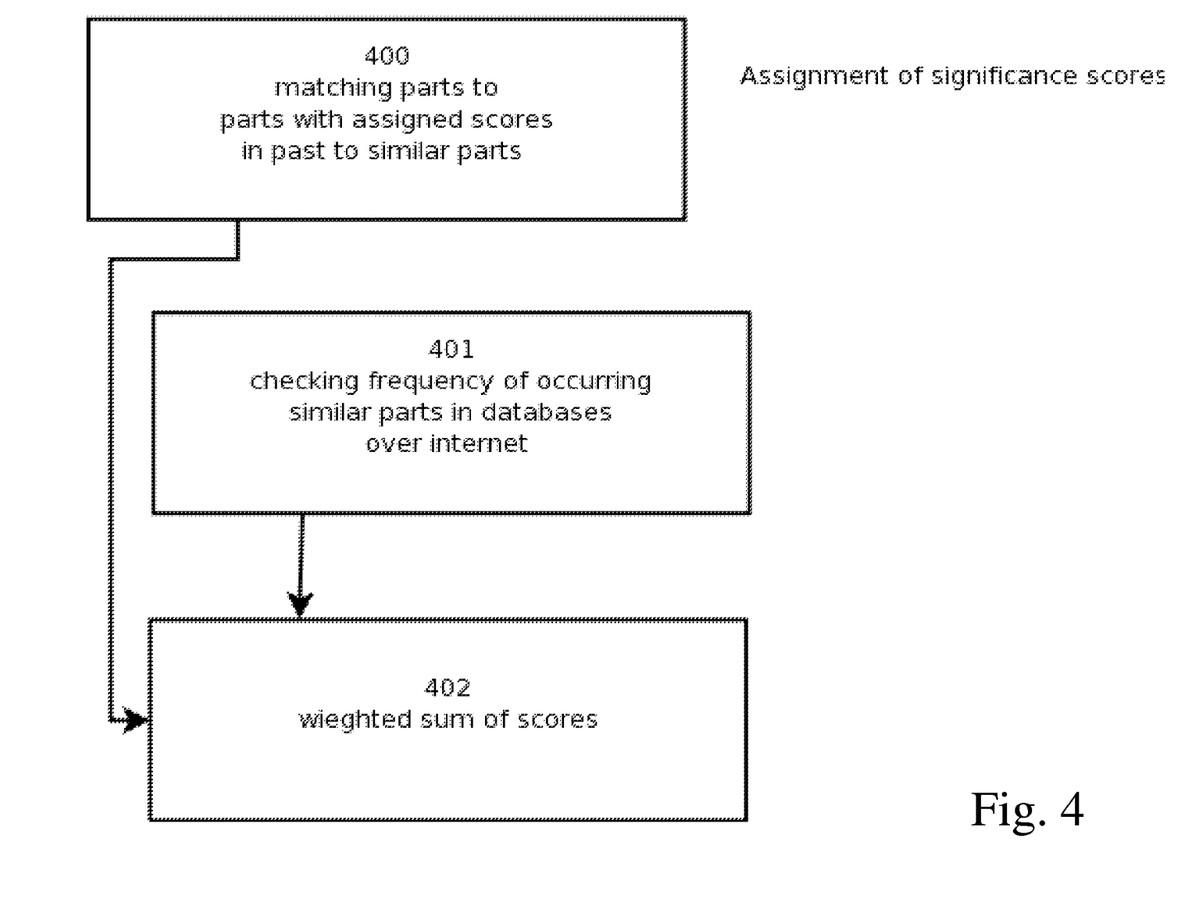
FIG. 4 is a flow diagram illustrating a method of assigning significance scores in one embodiment of the present disclosure.

FIG. 4 is a flow diagram illustrating a method of assigning significance scores, e.g., shown at 201 in FIG. 2, in one embodiment of the present disclosure. At 400, the parts of segments of the document are matched with similar parts or segments identified previously and which have been scored. Such similar parts or segments may have been stored in a repository or a database of document segments (also referred to as database of media parts or media granulars). Scoring may be based on the number of similar segments, e.g., by counting similar segments; those with higher number (frequency) may be scored higher. Segments with no previous similar parts may be assigned initial base scores, e.g., zero. Further, when new data is obtained and parts of this data are matched to previously scored parts, those scores are changed (e.g., incrementally increased). Weights can be used, for example, to take into account other factors (e.g., frequency of data set being considered).

At 401, the frequency of use of those segments, e.g., in databases, web pages over the Internet and other uses may be checked, accumulating the number of time they are used.

At 402, the weighted sum of the existing score and the currently checked frequency is computed. For example, consider an example in which an object X (media part) has a score (e.g., previous score) of N. Then new data sets A1, A2, A3 are obtained. In A1, the object X is counted C1 times; in A2, the object X is counted C2 times; and in A3, the object X is counted C3 times. Assume that a probability to get data A1 (i.e., the probability the data A1 will be encountered) is Prob(A1), data A2 is Prob(A2) and data A3 is Prob(A3). Then a new score for X is N+Prob(A1)*C1+Prob(A2)*C2+A3*Prob(C3).

In one embodiment, to keep the database of media granulars within a manageable size, e.g., control the database from growing in size with media granulars that may not be significant, a media granular that has a score below a minimum threshold, or e.g., example, that has not been accessed for a predetermined period of time, or only infrequently (e.g., as measured by a predetermined frequency number), may be removed from the database.

Figure 5:
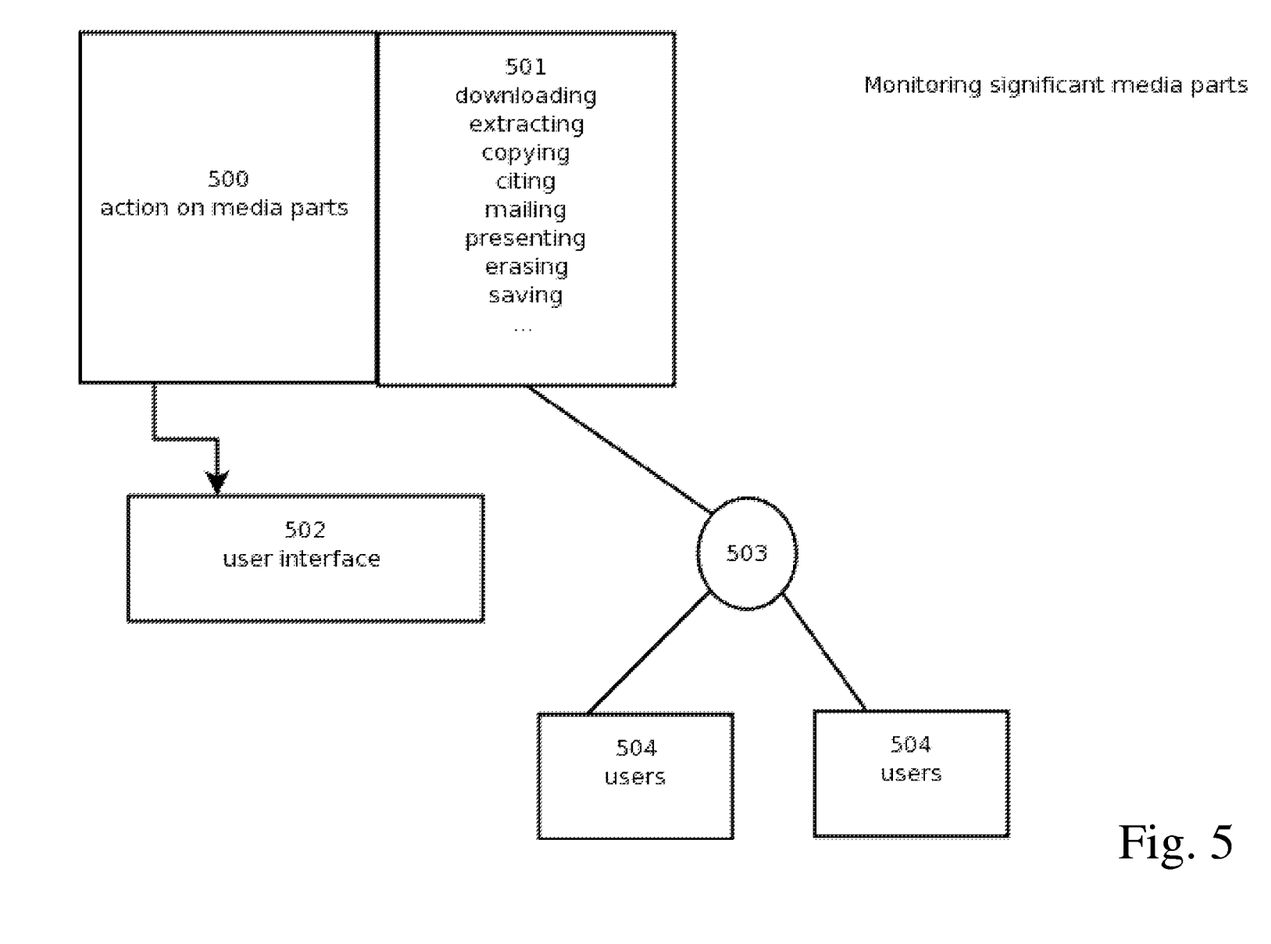
FIG. 5 is a diagram illustrating a method of monitoring significant media parts over a period of time in one embodiment of the present disclosure.

FIG. 5 is a flow diagram illustrating a method of monitoring significant media parts over a period of time, e.g., shown at 202 in FIG. 2, in one embodiment of the present disclosure. Actions 503 from one or more users 504, e.g., over an internet (e.g., the Internet), with respect to or on the segments or media parts may be detected at 500. The detection may done automatically, e.g., by one or more applications that a user uses to access a media part, or an agent module that may be attached or linked to the one or more applications. Examples of such applications may include an e-mail program, a document editor program, a user interface program (e.g., shown at 502) or a web interface program that enables a user to enter or edit data, and others. Examples of actions may include, but are not limited to, downloading, extracting, copying, citing, mailing, presenting, erasing, saving, entering manually, translating, changing, generating new instances, and/or other actions. As an example, copying may include copying the media granular from a given media type (e.g., the painting of Mona Lisa's smile) into a new instance of the same media type (e.g., a photo of the painting which is still a picture, same media type). As another example, copying may include copying the media granular from a given media type (e.g., a painting including Mona Lisa's smile) into a different type (e.g., the text "Mona Lisa's smile").

For instance, a user interface 502 may detect the user actions the user performs. Examples of user actions detected by the user interface 502 may include, but are not limited to, the user printing some material (e.g., clicking a print button), user sending email with this material (e.g., clicking send email button). Scoring may be performed automatically when those types of user actions are detected on a material or object, e.g., as to how many times certain types of user interface activities are performed on certain type of material (e.g., printed X for different users or X was emailed for different users).

Figure 6:
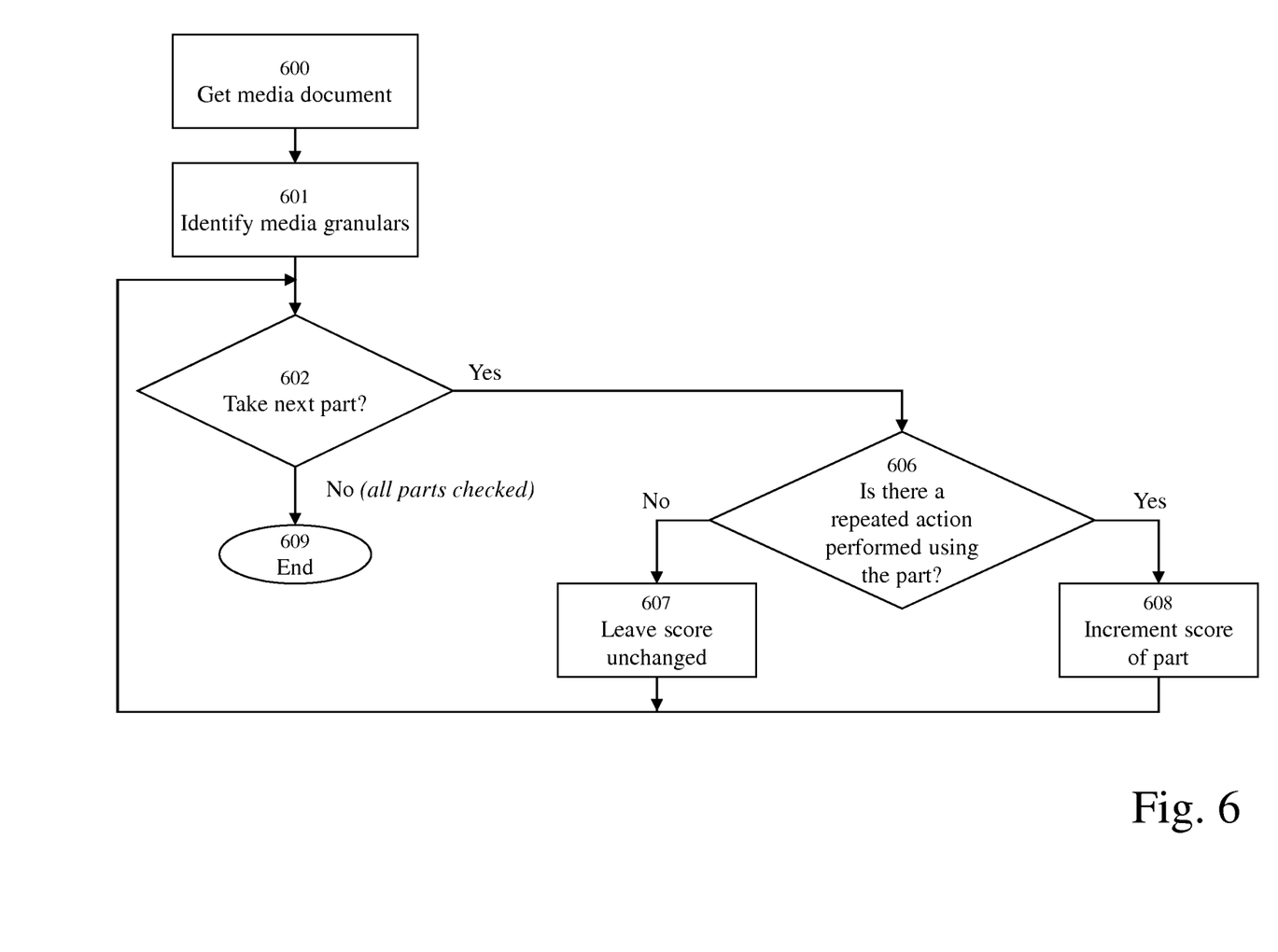
FIG. 6 is a flow diagram illustrating a method of indexing media granular in one embodiment of the present disclosure.

FIG. 6 is a flow diagram illustrating a method of indexing and scoring granulars in one embodiment of the present disclosure. At 600, a document such as a media document is received or obtained. At 601, media granulars in the document are identified. For instance, the content of the document may be analyzed to determine whether it contains one or more media granulars stored in a database of media granulars, e.g., match a granular in the document with a granular in the database. In one aspect, the matching of media granulars may be based on a predetermined threshold of similarity or sameness between the granulars. For example, if the two media granulars match exactly (100%) or have 90% or more of the same content, then the segments may be deemed matched. The threshold may be configurable. In another aspect, media granulars may be identified according to a granularization process shown with reference to FIG. 1 at 102. In this respect, if a media granular is identified in the document that does not match an existing media granular in the database of media granulars, and a repeated action is detected on that media granular, the media granular may be saved in the database of media granulars with an assigned score.

For each media granular identified, the processing at 602, 606, 607, 608 may be performed. For instance, for each media granular identified at 602, it is determined at 606 whether a repeated action is performed using the media granular. Actions may be categorized as either different or the same. For example, a "print" action is different from an "email" action. If the user printed the same material twice or more times, the action is repeated. In one embodiment of the present disclosure, such repeated action may increase the media granular's score.

At 608, in response to determining that there is a repeated action, the score associated with the media granular is incremented. Otherwise, at 607, the score associated with the media granular does not change.

In one aspect, historical data may be maintained, e.g., concerning when new instances of the media granular are created, the type of actions performed with the media granular, the number of times new instances of the media granular are created, the number of times actions on the media granulars were performed, indication of when the instances are created (e.g., time and date), indication of the type of the newly created instance (e.g., 4 new text, and 100 new drawings of Mona Lisa's smile), an identifier of a user who used the media granulars, time of use of the media granular and/or how the media granular was used, and/or others. Such data may be used in assigning and/or updating a score associated with a media granular.

Other considerations taken in assigning scores and/or indexing of media granulars may include observing and maintaining an indication of the level of a given newly created instance, wherein the level of an instance indicates the number of times the given instance's media has been changed. For example, if the new instance is of the same media type as the source, then the level of the new instance is the same as the source, e.g., the level of the new textual object "e=mc^^2" is the same as the textual source object "e=mc^^2", while the level of the gif image of the text object "e=mc^^2" equals the level of the source text object "e=m^c^^2"+1. In one aspect, the level may reflect types of media. For instance, different types of media have different levels. Indexing can contain the information as to how many times each instance was created in a given type of media. For example, an instance of an object or media in a textual form may be given one level (e.g., level 1) and a pictorial image of the same instance given another level (e.g., level 2).

In another aspect, one media granular may be associated or embedded in another media granular, e.g., picture of Mona Lisa's smile within picture of Mona Lisa's face, the text "John Hancock" within the photo of the US Constitution.

Yet in another aspect, a query may be made of the media granulars detected and for example, indexed, according to a methodology of the present disclosure in one embodiment. A user interface program or module may be provided to enable users to make such queries. An example of a query may be to determine the overall popularity of a given media granular. For example, the overall popularity may be determined by the score assigned to the given media granular. As another example, a query may be to determine one or more media granulars used during a specified time period or by a specified user, or combinations thereof. The response may be determined based on the historical data and scores associated with the media granulars.

Figure 7:
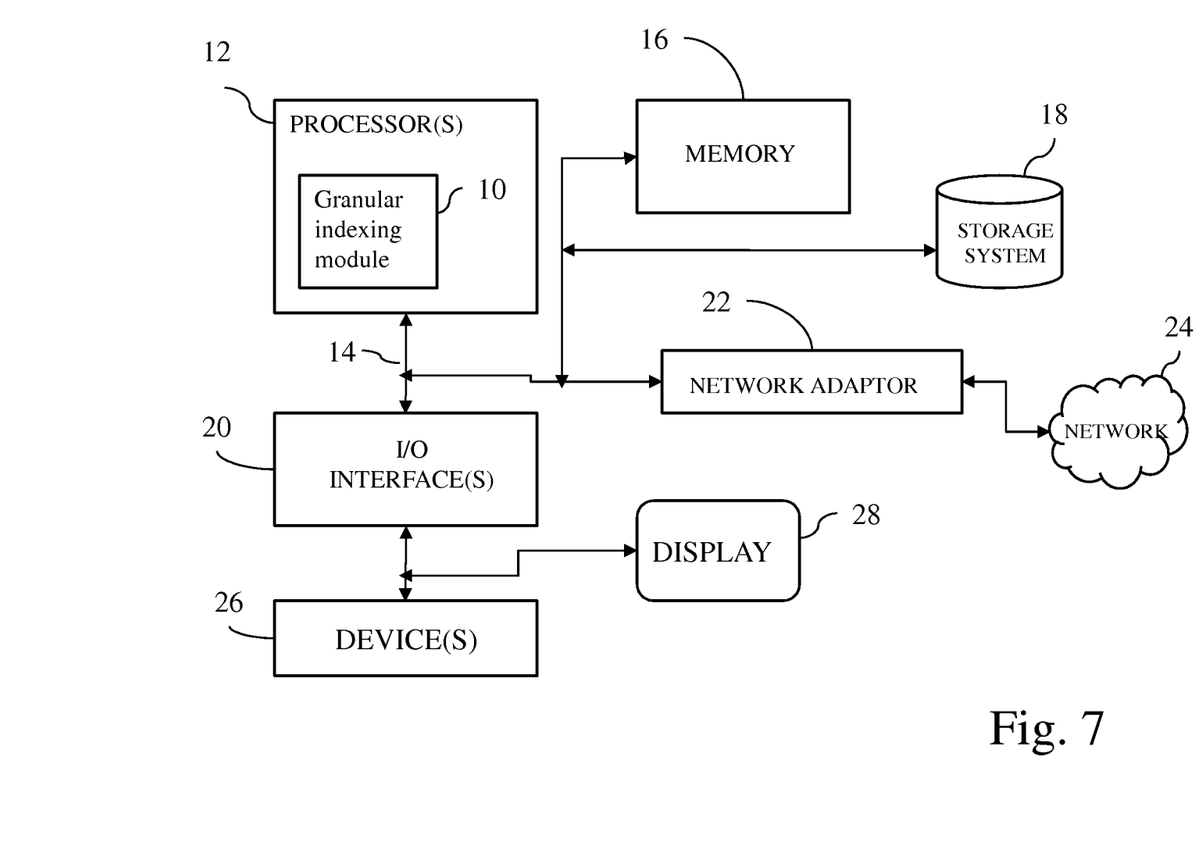
FIG. 7 illustrates a schematic of an example computer or processing system that may implement a system that identifies and indexes media granulars in one embodiment of the present disclosure.

FIG. 7 illustrates a schematic of an example computer or processing system that may implement the indexing of media granulars system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include an indexing module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for identifying significant media granulars, comprising:
    partitioning a media document into one or more media granulars;
    assigning a score to each of the one or more media granulars;
    monitoring, by one or more processors, said one or more media granulars to detect one or more user actions on said one or more media granular;
    updating, by one or more of the processors, the score associated with a respective one of the media granulars based on a number of user actions detected on the respective one of the media granulars;
    identifying a media granular as significant based on the score meeting a threshold; and
    maintaining a level of a given newly created instance associated with the media granular, wherein the level indicates a number of times the given newly created instance's media associated with the media granular has been changed into a different type of media, different types of media comprising at least textual form and pictorial image.

2. The method of claim 1, wherein the partition, the assigning, the monitoring, the updating and the identifying are repeated for a plurality of media documents.

3. The method of claim 2, wherein the media granulars identified as significant are indexed with associated scores.

4. The method of claim 3, further comprising:
    receiving a new document;
    identifying one or more of the media granulars in the new document;
    monitoring for a repeated action on said one or more of the media granulars in the new document; and
    increasing the score associated with said one or more of the media granulars in the new document in response to detecting the repeated action.

5. The method of claim 4, wherein the identifying one or more of the media granulars in the new document comprises matching said one or more of the media granulars in the new document with said media granulars identified as significant.

6. The method of claim 1, wherein the media granular comprises at least one of text, audio, graphic, video, biometrics, mathematical formula, or combinations thereof.

7. The method of claim 1, wherein the one or more user actions on the media granular comprises at least one of extracting, copying, entering manually, translating, sending, printing, presenting, changing, generating new instances, or combinations thereof.

8. The method of claim 1, further comprising maintaining historical data associated with a creation time of one or more new instances of the one or more media granulars, a number of times the new instances of the one or more media granulars are created, one or more types of the new instances, one or more types of user actions performed on the one or more media granulars, a number of times the types of user actions are performed on the one or more media granulars, one or more levels of change associated with the one or more media granulars, an identifier of a user who used the one or more media granulars, or time of use of the one or more media granulars, or combinations thereof,
    wherein the historical data is considered in the assigning of the score.

9. The method of claim 1, further comprising allowing for querying of the one or more media granulars.

10. The method of claim 9, wherein the querying comprises:
- querying for an overall popularity of the one or more media granulars, wherein the overall popularity is determined based on associated scores assigned to the one or more of media granulars; or
- querying for one or more media granulars used during a specified time period or by a specified user, or combinations thereof; or
- combinations thereof.

11. The method of claim 1, further comprising:
generating a citation index comprising one or more articles in which the media granular is cited.

12. The method of claim 1, wherein the score is updated further based on the level.

* * * * *